United States Patent Office 2,915,451
Patented Dec. 1, 1959

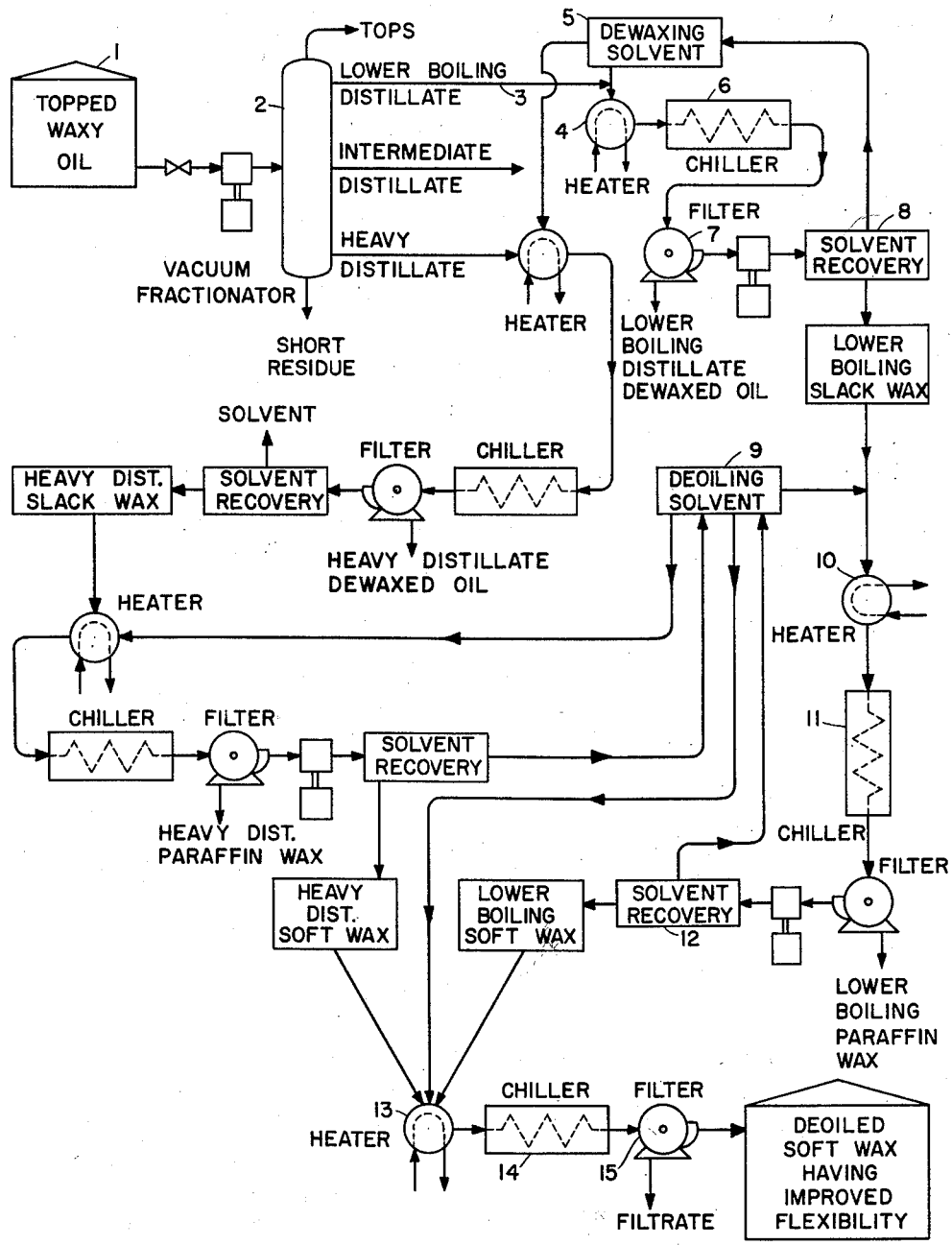

2,915,451

PROCESS FOR THE PREPARATION OF HYDROCARBON WAX COMPOSITIONS

Delmar M. Bartay, Pasadena, Tex., assignor to Shell Development Company, New York, N.Y., a corporation of Delaware Application September 16, 1957, Serial No. 684,265

4 Claims. (Cl. 208—31)

This invention relates to the preparation of hydrocarbon wax compositions. More particularly, it pertains to the preparation and recovery of hydrocarbon petroleum waxes having improved ductility, flexibility and low temperature resistance to shock chilling. Still more specifically, it pertains to the preparation of such waxes by the inclusion of certain soft waxes normally eliminated during the dewaxing processes previously known in the art.

Various methods have been used and suggested for the recovery of paraffin waxes and microcrystalline waxes from mineral oil distillates and residues. Thus, it is known to dewax waxy mineral oils or fractions thereof by cooling, usually after addition of a solvent or diluent. Dependent upon the nature of the oil and the conditions of the operation, such as the lowest cooling temperature, rate of cooling, manner of cooling, etc., the waxes so obtained have certain shortcomings which it is desirable to correct.

Certain steps in this direction have been taken by the recovery of soft wax components in the soft wax fraction usually rejected during a deoiling step. A measurable amount of improvement can be obtained, for example, by recycling soft waxes to a slack wax of the same volatility and deoiling the mixture to obtain a wax having improved flexibility properties. However, the degree of improvement is limited by the use of such a process and little further improvement can be expected even if soft wax components of a somewhat higher molecular weight are included.

The soft wax fractions are normally sent to cracking or otherwise disposed of under circumstances that its rated dollar value is extremely low as compared to commercial grade hydrocarbon waxes. Hence, any process which results in a usable recovery of soft waxes and at the same time materially improves the flexibility characteristics of ordinary paraffin waxes results in a corresponding increment in the value of the dewaxing process.

In the deoiling of slack waxes, steps have previously been taken to incorporate, insofar as possible, soft wax fractions by lowering the temperature of deoiling to such a point that soft waxes crystallize with higher melting point wax fractions. While it is thus possible to segregate a certain proportion of the soft waxes, the use of the low deoiling temperature also causes an increase in the viscosity of the oil from which the waxes must be separated. Because of this increase in viscosity, the oil tends to be retained upon the surfaces of the wax crystals and thus the product so obtained is often found to contain too great a proportion of oil.

Moreover, it will be seen that if the low temperature deoiling of slack waxes is utilized as a method for retaining insofar as possible the soft waxes normally disposed of in the filtrate of a deoiling operation, the result is limited by the proportion of soft waxes normally occurring in the waxy oil stock treated. Hence, if the proportion of soft waxes is either unduly high or unduly low it will be found that this resulting mixture of hydrocarbon waxes will not meet the specifications set out by users of the waxes, such as milk carton manufacturers, paper coating manufacturers and the like.

It is an object of the present invention to improve the processes for the preparation of wax compositions. It is another object of this invention to improve the low temperature properties of hydrocarbon waxes. It is a particular object of the present invention to provide a process for the preparation of wax compositions exhibiting improved resistance to cracking upon shock chilling. Other objects will become apparent in the following discussion.

Now in accordance with this invention, it has been found that improved wax properties, especially at low temperatures, may be obtained by the inclusion of a substantial portion of deoiled soft wax components obtained by the deoiling of a soft wax derived from a lubricating oil distillate having a 10–90% boiling range between about 430° and 600° C. More particularly, an improved process for the preparation of wax compositions having improved flexibility, ductility and resistance to cracking upon shock chilling comprises mixing soft waxes derived from a heavy distillate waxy oil boiling within the above range (and preferably a 10–90% boiling range between 460 and 580° C.) and soft waxes derived from one or more lower boiling lubricating oil distillates preferably having a 10–90% boiling range between 400 and 525° C., and deoiling the mixed soft waxes to obtain deoiled soft wax having improved low temperature properties. A particular aspect of the present invention comprises mixing 20–40 (preferably 25–35) volumes of the heavy distillate soft wax with 80–60 (preferably 75–65) volumes of soft waxes from lower boiling (including intermediate boiling) lubricating oil distillates, deoiling the same and thereafter blending the deoiled soft wax (10–40 volumes, preferably 15–35 volumes) with a paraffin wax (90–60 volumes, preferably 85–75 volumes) preferably having a melting point between 120 and 135° F. which comprises predominantly normal paraffin hydrocarbon wax molecules. As will be seen by the data to be given hereinafter, the inclusion of deoiled soft wax components derived from heavy distillates unexpectedly improves the resistance to cracking upon shock chilling and also unexpectedly increases the softness of the wax.

The foregoing objects and others as well as the process of the present invention will be better understood by reference to the accompanying drawing wherein a typical arrangement of apparatus for carrying out the process of the present invention is presented.

Referring now to the drawing, a topped waxy lube crude oil contained in a storage tank 1 is conveyed to a vacuum distillation column 2 wherein the oil is separated into fractions according to boiling point ranges, which for convenience in description will be referred to as tops, a lower-boiling waxy lube distillate, an intermediate-boiling waxy lube distillate, a heavy waxy lube distillate, and a short residue. The lower boiling waxy distillate may be conveyed through line 3 to a heater 4 wherein, or just prior thereto, it is mixed with a dewaxing solvent from a surge tank 5. When the diluted distillate has been heated and all of the components are dissolved in a single phase, the solution is sent to a chiller 6 wherein the solution is chilled to precipitate waxes normally predominating in normal paraffin waxes. The precipitated wax is removed such as by filtration on filter 7 and the separated wax is sent to a solvent recovery unit 8 where the retained solvent is removed, as by distillation, with the isolation of a lower boiling slack wax. This is then mixed with a deoiling solvent from source 9 and the mixture so formed is sent to a heater 10 to produce a uniform solution. The homogeneous mixture is then sent to chiller 11 to precipitate the lower boiling paraffin wax, leaving the soft wax dissolved in the oil and solvent.

This latter filtrate is sent to a solvent recovery unit 12 wherein solvent is distilled or otherwise removed from the soft wax.

The same series of operational steps is carried out at least with the waxy heavy distillate fraction, said fraction have a 10–90% boiling range between about 430° and 600° C. (or more restricted) at atmospheric pressure. The processing is carried out in a parallel set of apparatus or, in a "blocked-out" operation, at a different time through the same apparatus just described. By this means, a heavy distillate soft wax is obtained which is then mixed with the lower boiling soft wax and a deoiling solvent, passed to heater 13 to form a homogeneous solution and then to chiller 14 to precipitate the soft wax fractions, the oil remaining dissolved in the deoiling solvent. The latter is separated from the soft wax on filter 15. This processing order yields a deoiled soft wax having substantially improved flexibility as compared to the products obtained by separate deoiling of the heavy distillate soft wax on the one hand and the lower boiling soft wax on the other. This differentiation will be demonstrated by data which will be given hereinafter.

In order to realize the optimum benefits from the present invention, it is preferred that the deoiled soft wax from heavy distillate be mixed with soft wax from lower boiling fractions in a ratio of 20–40 volumes of heavy distillate soft wax to 80–60 volumes of lower boiling distillate soft wax. The resulting mixture has been shown to have an unexpectedly improved, i.e. increased softness as measured by penetration and an improved resistance to cracking upon shock chilling. Also, in accordance with the present invention, advantage may be taken of the improved low temperature properties of this special soft wax composition by blending of 10–40 volumes of the deoiled soft wax composition derived as described above with 90–60 volumes of paraffin waxes predominating in normal paraffins.

The waxy petroleum oils which may be treated according to the process of the present invention comprise either distillate petroleum fractions particularly the distillate lubricating oil fractions, as well as residual oils such as short residues and the like. It is well known that the paraffin waxes exist largely in the distillate fractions (with the exception of the high melting point paraffins which may be present in the residues), while the microcrystalline waxes are normally found in the residual oils either alone or in combination with any high melting point normal paraffins which may be present. The proportions of waxes in these fractions are well known in the art. The major components of the present compositions, insofar as they are paraffin-wax-containing petroleum oils, comprise normal and iso-paraffin hydrocarbon waxes having individual melting points within the usual range of from about 110° to about 150° F., more normally between about 115 and 145° F. The paraffin waxes usually predominate in normal paraffins and may comprise a single wax but ordinarily will be a mixture of relatively closely related paraffin waxes. The general practice is to distill a board lubricating oil fraction which may be dearomatized, either prior to or subsequent to the distillation, for the preparation of relatively narrow boiling range waxy oil cuts.

The initial dewaxing operation is by means of selective solvents which are well known in the art. In carrying out the improved process of the present invention, the dewaxing and deoiling operations are accomplished by chilling the waxy oils together with oil solvents or diluents including, for example, ketones such as acetone, methyl ethyl ketone, methyl propyl ketone, methyl isobutyl ketone, etc.; alcohols such as ethyl alcohol, isopropyl alcohol, normal propyl alcohol and the like. Petroleum naphthas, halogenated hydrocarbons, such as ethylene dichloride and dichloroethylene; hydrocarbons such as benzene, toluene, ethane, ethylene, propane, propylene, butane, isobutane, etc. Mixtures of solvents or diluents such as benzene together with methyl ethyl ketone may be employed as disclosed in prior art dewaxing processes.

Solvent dewaxing and deoiling may be carried out at temperatures which are well known and with proportions of solvent to waxy oil or oily wax which are known in the art. Dewaxing temperatures are usually in the range from about −15° F. to +15° F., the dewaxing solvents being present in amounts from about 2 to about 4 volumes per volume of waxy oil. Dewaxing usually results in the formation of a dewaxed oil and a slack wax, the latter term being applied to the wax product contaminated with a greater or lesser amount of oil or oil like constituents. The slack wax normally contains from about 2 to about 60% by weight of oil but this figure may vary broadly. In deoiling operations the proportion of solvent is normally increased to between about 4 and about 7 volumes per volume of oily wax, deoiling temperatures being usually between about 40° F. and 65° F.

The soft waxes comprise mixtures of highly branched or naphthenic waxes having substantially lower melting points and other more plastic properties than those of the more nearly straight chain waxes of the same molecular weight occurring in the same boiling range fraction. Consequently, within a given narrow boiling range there may be relatively high melting waxes which are typical n-paraffin waxes as well as low melting waxes which approach the subject soft wax fractions normally eliminated in the filtrate from the deoiling of a slack wax. The boiling range of the waxes in the soft wax fraction is roughly coextensive with the boiling range of the paraffin waxes naturally existing within the same petroleum oil fraction being processed. The soft wax fractions can best be described by reference to the lubricating oil fractions from which they are obtained by dewaxing and deoiling operations. Thus, the essential heavy distillate soft wax is accurately described as being obtained by the dewaxing of a lubricating oil distillate boiling within the limits from about 430 to 600° C. at atmospheric pressure. The deoiled soft wax obtained therefrom predominates in non-straight chain hydrocarbon waxes usually of isoparaffinic or naphthenic structure and containing from about 23 to about 45 carbon atoms per molecule. The lower boiling soft wax with which this essential heavy distillate soft wax is combined contains essentially non-straight chain hydrocarbons of lower molecular weight, the wax fractions of which usually contain about 20 to 28 carbon atoms per molecule although a certain amount of overlapping between the lower boiling soft wax and the heavy distillate soft wax may indeed occur.

The wax compositions derived according to the process described and claimed are especially useful for the coating of paper or paper cartons, such as milk cartons, or frozen food cartons especially when they are combined in the described proportion of normal paraffin waxes. This is especially illustrated by the data contained in the working examples. The presence of the heavy distillate soft wax fraction drastically reduces the cracking which occurs upon the shock chilling of such wax compositions. The examples which follow illustrate the benefits of the present invention and also demonstrate the benefits as compared to other waxes derived by processes not falling within the scope of the present invention.

An East Texas long residue was distilled to give a number of relatively narrow boiling fractions including a fraction boiling from about 430 to 523° C., the boiling range being the 10% and 90% points respectively, and a heavy distillate fraction, the 10–90% boiling range being from about 485 to 580° C. These fractions were separately dewaxed by a mixture with 3 parts by volume of equal volumes of methyl ketone and toluene, cooling to −22° C. and filtering to obtain slack waxes comprising normal paraffin wax and the respective soft waxes. The slack waxes were subjected to deoiling in order to separate precipitated paraffin waxes from the solutions of soft waxes comprising deoiling solvent, soft waxes and oil. The solutions of soft wax were combined in the proportion indicated in the tables and the blend dissolved at a temperature of 150° F. in four parts of a solvent consisting of approximately equal volumes of methyl ethyl ketone and toluene for each part of the combined soft waxes. The solution was cooled to 30° F. and the precipitated deoiled soft wax fraction separated by filtration. The separated soft wax fractions were washed on the filter with three parts of a solvent at 30° F. This washed wax was repulped with solvent at the same temperature, using 1.4 parts of solvent, filtered and the separated wax on the filter washed with 1.2 parts of solvent at 30° F. The separated wax was stripped of solvent by distillation. The soft waxes from lower boiling, intermediate boiling and heavy distillate streams were deoiled separately under the same conditions of solvent temperature and solvent ratios similar to those described above. Data were obtained on the wax samples both obtained by the combination of soft waxes and upon the individual waxes after deoiling. The data contained in the table which follows indicate that the soft wax fraction obtained by deoiling the combination of heavy distillate soft wax and the intermediate and low boiling soft wax is much softer at room temperature than ordinary paraffin waxes and softer than low melting waxes recovered from the individual soft wax streams under the same deoiling conditions. This is shown by the needle penetration at 77° F.

In order to demonstrate the advantage of the present invention when the product obtained by the combined deoiling of heavy distillate soft wax and intermediate and/or low boiling soft waxes is added to a normal paraffin wax, 15% of the deoiled combined soft waxes was blended with the normal paraffin wax having a melting point of 133° F. The wax composition so obtained was subjected to a low temperature fracture resistance test which is performed as follows: 5 milliliters of molten wax is placed in an unwaxed milk carton bottom, allowed to solidify and then conditioned for one hour at 73° F. The carton bottom is then plunged into 35° F. water for one minute and the number of inches of cracking is determined by measurement with a map mileage gauge. A good wax shows little or no cracking in this test.

Table 1 presents the data obtained on the samples of deoiled soft waxes and combinations thereof as described above.

The advantages of the present invention were further illustrated by the comparative testing of waxes obtained by the combination of soft waxes from a low boiling distillate and the soft wax from an intermediate boiling distillate. The data in Table 2 show that this wax, even though of a lower molecular wieght, is not satisfactory for the production of wax compositions having optimum low temperature properties. Table 2 also includes a composition wherein the proportion of soft wax from a heavy distillate was reduced to about 4.5% by weight of the deoiled soft wax composition. Again, it will be seen by the data that a greater proportion of a heavy distillate soft wax component is necessary to obtain maximum improvement in low temperature properties. The third sample contained in Table 2 was prepared by combining two parts by volume of soft wax from an intermediate-boiling waxy lubricating oil with one part by volume of soft wax from a heavy distillate. The properties indicate that this wax shows better low temperature properties than deoiled soft waxes from any of the individual soft wax streams as shown in Table 1, but the properties are not as good as those obtained when a substantial proportion of soft wax from low boiling waxy distillate is present in the composition.

TABLE 2

*Laboratory soft wax deoiling and blending experiments yields and properties*

| Sample | H[1] | J[1] | K[1] |
|---|---|---|---|
| Yield of Product Wax, percent w., basis feed to deoiling | 51.5 | 53.0 | 40.7 |
| Melting point of product wax, °F., ASTM D-87 | 112.3 | 112.5 | 111.4 |
| Low Temperature Fracture Resistance of Blend of 15% product wax in 133° F. paraffin, inches of cracks | 11 | 10 | 5 |
| Penetration at 77° F., mm./10 ASTM D-1321 | 42 | 42 | 63 |
| Oil Content, percent w., ASTM D-721 | 0.4 | 0.2 | 0.5 |

[1] Compositions of feeds to deoiling and blending experiments: H—46% low boiling soft wax, 49.5% intermediate boiling soft wax, 4.5% heavy distillate soft wax, production ratio. J—50% low boiling soft wax, 50% intermediate boiling soft wax. K—67% intermediate boiling soft wax, 33% heavy distillate soft wax.

I claim as my invention:

1. The process of segregating a waxy lubricating oil into dewaxed lubricating oil and waxes of improved

TABLE 1

*Properties of product waxes*

| Sample | Soft Wax Deoiling Experiments | | | | Product Wax Blends | | Fully Refined Paraffin |
|---|---|---|---|---|---|---|---|
| | A | B | C | D | E | F | |
| Composition | Low Boiling Soft Wax[1] Intermediate Boiling Soft Wax[1] Heavy Distillate Soft Wax[1] (1:1:1) | Low Boiling Soft | Intermediate Boiling Soft Wax | Heavy Distillate Soft Wax | 50% B 50% C (1:1) | 33⅓% B 33⅓% C 33⅓% D (1:1:1) | |
| Yield of product wax, percent w., basis feed to deoiling | 45.5 | 60.3 | 35.0 | 27.5 | | | |
| Melting point of product wax, °F., ASTM D-87 | 111.0 | 114.4 | 111.2 | 117.9 | 113.0 | 113.0 | 133.0 |
| Low temperature fracture resistance of 15% product wax in 133° F. paraffin, inches of cracks | 0 to ½ | 20 | 9 to 10 | 8 to 10 | 15 | 10 | 30 |
| Penetration at 77° F., mm./10, ASTM D-1321 | 70 | 34 | 60 | 43 | 46 | 51 | 12 |
| Oil, percent w., ASTM D-721 | 1.2 | 1.9 | 0.6 | 0.5 | | | 0.1 |

[1] See the following table.

| | Vapor Temperature, °C. at Atmospheric Pressure | |
|---|---|---|
| | 10% | 90% |
| Low Boiling Soft Wax | 420 | 460 |
| Intermediate Boiling Soft Wax | 460 | 523 |
| Heavy Distillate Soft Wax | 485 | 580 | flexibility comprising the steps of fractionally distilling said oil into a plurality of relatively narrow-boiling waxy oil distillates, one of which comprises a heavy distillate having a 10%–90% boiling range between about 430 and 600° C. and another of which is a lower boiling range distillate, separately solvent dewaxing the distillates to produce dewaxed oils and slack waxes, separately solvent deoiling the slack waxes to produce deoiled paraffin waxes, a heavy distillate soft wax and a lower boiling distillate soft wax, combining the soft waxes in a ratio of 20 to 40 volumes of heavy distillate soft wax to 80 to 60 volumes of lower boiling distillate soft wax, and solvent deoiling the mixed soft waxes, whereby a deoiled soft wax composition having improved flexibility is obtained.

2. A process according to claim 1 wherein the deoiled soft wax composition is combined with a distillate paraffin wax predominating in normal paraffin hydrocarbons in a ratio of 10–40 volumes of deoiled soft wax to 90–60 volumes of paraffin wax, whereby a paraffin wax composition of improved flexibility is obtained.

3. The process of segregating a waxy lubricating oil stock into dewaxed lubricating oils and waxes of improved flexibility comprising the steps of fractionally distilling said stock into a plurality of relatively narrow-boiling waxy oil distillates, one of which comprises a heavy distillate having a 10%–90% boiling range of about 460–580° C. and another of which has a lower boiling range of about 400–525° C., separately solvent dewaxing the distillates to produce dewaxed oils and slack waxes, separately solvent deoiling the slack waxes to produce deoiled paraffin waxes, a heavy distillate soft wax and a lower boiling distillate soft wax, combining the soft waxes in a ratio of 25–35 volumes of heavy distillate soft wax to 75–65 volumes of lower boiling distillate soft wax, and solvent deoiling the mixed soft waxes, whereby a deoiled soft wax composition having improved flexibility is obtained.

4. A process according to claim 3 wherein the deoiled soft wax composition is combined with a distillate paraffin wax predominating in normal paraffin hydrocarbons having an average melting point between about 120° and about 135° F. in a ratio of 15–35 volumes of deoiled soft wax to 85–75 volumes of paraffin wax, whereby a paraffin wax composition of improved flexibility is obtained.

References Cited in the file of this patent

UNITED STATES PATENTS

| | | |
|---|---|---|
| 2,248,668 | Gee | July 8, 1941 |
| 2,611,734 | Ridenour | Sept. 23, 1952 |
| 2,658,852 | Tiedje et al. | Nov. 10, 1953 |
| 2,758,100 | Bailly et al. | Aug. 7, 1956 |
| 2,761,814 | Post | Sept. 4, 1956 |